(12) United States Patent
Yamazaki (10) Patent No.: US 7,206,135 B2
(45) Date of Patent: Apr. 17, 2007

(54) IMAGE OBSERVING APPARATUS

(75) Inventor: Shoichi Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/293,328

(22) Filed: Dec. 2, 2005

(65) Prior Publication Data

US 2006/0119952 A1    Jun. 8, 2006

(30) Foreign Application Priority Data

Dec. 3, 2004    (JP)    ............................. 2004-351468

(51) Int. Cl.
*G02B 27/14* (2006.01)
*G09G 5/00* (2006.01)

(52) U.S. Cl. .......................................... 359/630; 345/8

(58) Field of Classification Search ........ 359/630–634; 345/7–9
See application file for complete search history.

(56) References Cited

U.S. PATENT DOCUMENTS 5,155,615 A * 10/1992 Tagawa ........................ 345/9

| 5,467,104 A | 11/1995 | Furness, III et al. |
| 5,702,132 A | 12/1997 | Friederich et al. |
| 5,757,544 A | 5/1998 | Tabata et al. |
| 2003/0197943 A1 | 10/2003 | Yamazaki et al. |

FOREIGN PATENT DOCUMENTS

| JP | 11-95144 | 4/1999 |
| JP | 2001-4955 | 1/2001 |

* cited by examiner

*Primary Examiner*—Alicia M Harrington
(74) *Attorney, Agent, or Firm*—Morgan & Finnegan LLP (57) ABSTRACT

An image observing apparatus has two light sources, a scanning mirror upon which light beams from the two light sources are incident in common, and two optical systems. The two optical systems respectively lead the light beams emitted from the two light sources and scanned by the scanning mirror to the right and left eyes of an observer. The light beams emitted respectively from the two light sources are scanned by the scanning mirror and form two-dimensional images for the right and left eyes on predetermined surfaces. Central field angle principal rays emitted respectively from the two light sources and reflected by the scanning mirror, exist on the same plane. Then, an angle made by the scanning mirror and by a surface vertical to the central field angle principal rays emerging from the two optical systems, is set so as to fall within a predetermined range.

9 Claims, 3 Drawing Sheets

TOP VIEW                    SIDE VIEW

IMAGE OBSERVING APPARATUS

BACKGROUND OF THE INVENTION

1. Field of the Invention

The present invention relates to an image observing apparatus suited to a head mounted display (HMD) and the like.

2. Related Background Art

At the present, a display device employed for the HMD is exemplified such as a transparent type liquid crystal element, a reflection type liquid crystal element, or an EL (Electroluminescence) element. These types of elements are, as necessary pixels must be all built up in the elements, easy to have occurrence of a pixel defect and hard to be manufactured.

Further, a display device is proposed in U.S. Pat. No. 5,467,104, wherein an image is displayed and observed by employing a scanning device without using a two-dimensional display device such as the liquid crystal element and the EL element.

U.S. Pat. No. 5,467,104 discloses a scan type image display device that scans light beams assuming respective colors of Red, Green, and Blue in a horizontal direction and in a vertical direction, and directly forms the image on a retina via an optical system. An extremely high speed scan of the light beams is requested for the scan type image display device disclosed in U.S. Pat. No. 5,467,104, and therefore an extremely small-sized device is employed for a scanning element such as a mirror for scanning the light. Accordingly, the light beam to be scanned is quite narrow and therefore has an extremely small diameter (a diameter of an exit pupil) in a position of a pupil of an observer.

Methods for expanding the small diameter of the exit pupil are also proposed (U.S. Pat. Nos. 5,701,132 and 5,757,544).

On the other hand, a comparatively small-sized optical system using an eccentric free-form curved surface optical system is also proposed (Japanese Patent Application Laid-Open No. 2001-004955).

Known further is an image display device (Japanese Patent Application Laid-Open No. H11-095144) in which a scanning means is shared with optical systems corresponding to right and left eyes.

According to configurations disclosed in U.S. Pat. Nos. 5,701,132 and 5,757,544, an intermediate image is temporarily formed to expand the diameter of the exit pupil, and hence the device tends to be scaled up due to an elongated optical path.

Further, according to Japanese Patent Application Laid-Open No. H11-095144, two scanning devices for the horizontal direction and the vertical direction are employed, and consequently the configuration becomes complicated. In the construction disclosed in Japanese Patent Application Laid-Open No. H11-095144, when trying to obtain the HMD having a further wide field angle, the scanning device for the vertical direction becomes extremely elongate in the horizontal direction, resulting in the scale-up of the image observing apparatus.

SUMMARY OF THE INVENTION

It is an object of the present invention to provide a small-sized image observing apparatus of such a type that two-dimensional image is formed by a scanning device.

An image observing apparatus exemplified according to the present invention has two light sources for right and left eyes, a scanning mirror upon which light beams from the two light sources are incident in common, and two optical systems for the right and left eyes. The two optical systems respectively lead the light beams emitted from the two light sources and scanned by the scanning mirror to the right and left eyes of an observer. The light beams emitted respectively from the two light sources are scanned by the scanning mirror and thereby respectively form two-dimensional images for the right and left eyes on predetermined surfaces. Central field angle principal rays emitted respectively from the two light sources and reflected by the scanning mirror, exist on the same plane. Then, an angle made by the scanning mirror and by a surface vertical to the central field angle principal rays emerging from the two optical systems, set so as to fall within a predetermined range.

DETAILED DESCRIPTION OF THE PREFERRED EMBODIMENTS

Embodiments of an image observing apparatus according to the present invention will hereinafter be described with reference to FIGS. 1 and 2.

Figure 1:
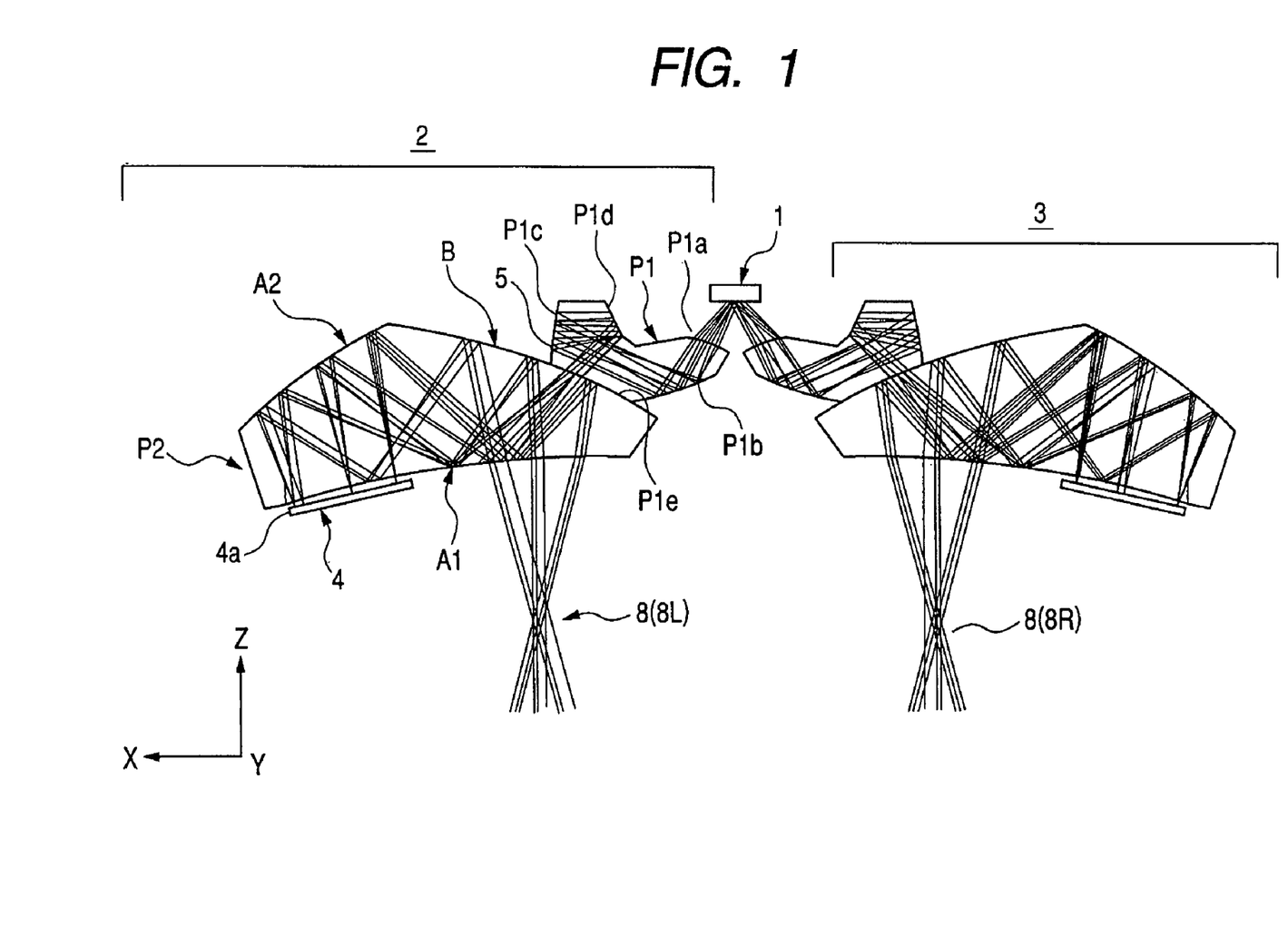
FIG. 1 is a view (a top view) showing optical paths from a two-dimensional scanning mirror to exit pupils in an image observing apparatus.
Figure 2:
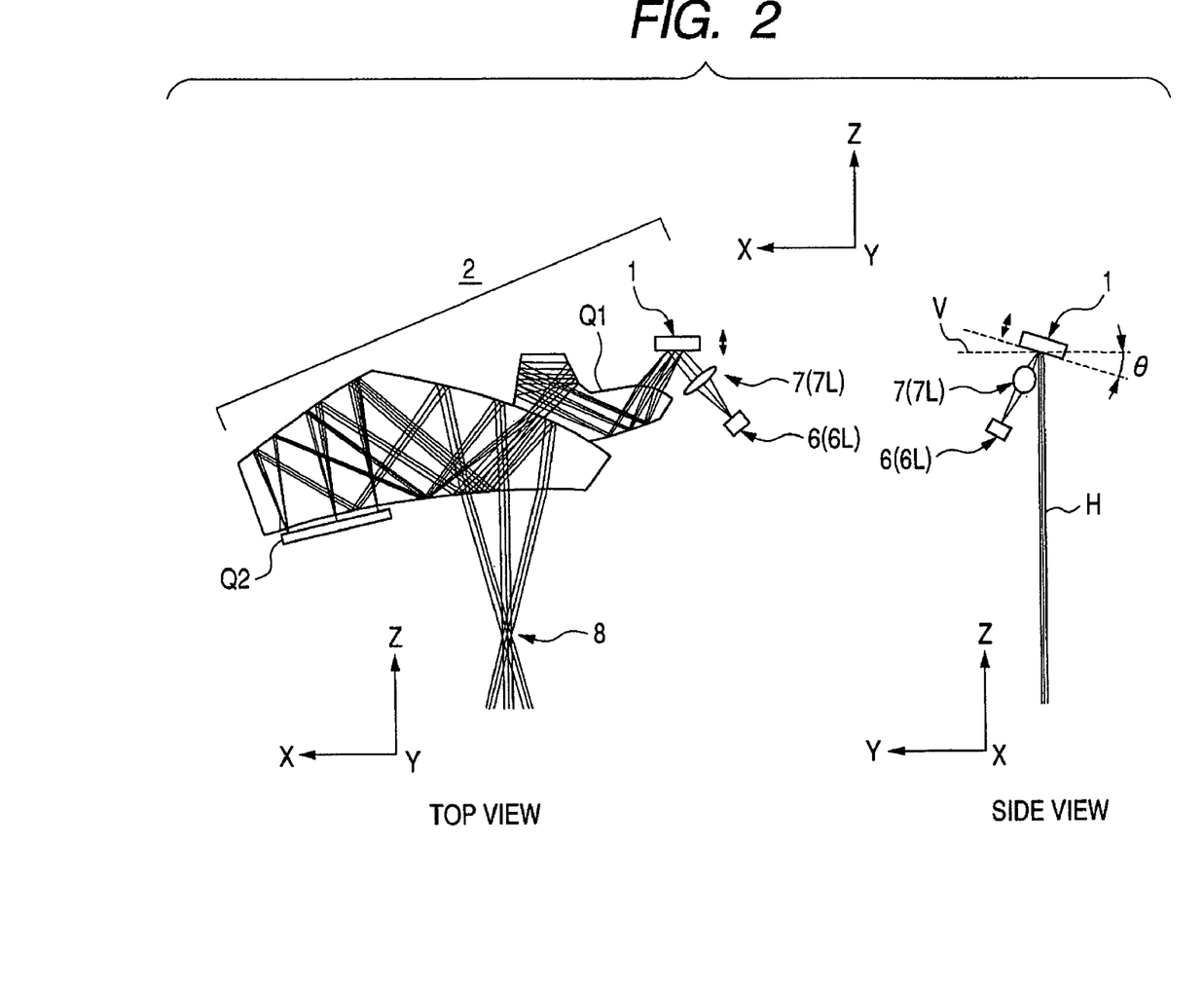
FIG. 2 is a view (a top view and a side view) showing the optical path from a light source for an left eye to the exit pupil of an optical system for the left eye in the image observing apparatus.

Referring to FIGS. 1 and 2, the reference numeral 1 denotes a two-dimensional scanning mirror (scanning mirror), 2 denotes an optical system for a left eye, 3 denotes an optical system for a right eye, 6 denotes a light source, 7 denotes a collimator lens, and 8 (8L, 8R) represent exit pupils of the optical systems 2, 3 respectively, which are defined as positions where the right and left eyes of an observer should be disposed.

FIG. 1 is a sectional view (a top view) showing optical paths from the scanning mirror 1 to the exit pupils 8 (8L, 8R) for the right and left eyes. FIG. 2 is a sectional view (a top view and a side view) of an optical path from the light source 6L for the left eye to the exit pupil 8L of the optical system 2 for the left eye.

The light source 6 is constructed of, though not illustrated, luminescent diodes (Light Emitting Diodes: LEDs) for three colors such as R(red), G (green) and B (blue), wherein the 3-color LEDs are disposed in optically equivalent positions by use of dichroic prisms etc. Further, the light sources 6 are independently provided for the right and left eyes. In FIG. 2, the light source 6L for the left eye is illustrated, while the light source 6R for the right eye is not illustrated. The 3-color LEDs configuring the light source 6 is independently capable of modulating a period of light emitting time and a light intensity, corresponding to image information and can be treated, as viewed from the scanning mirror 1, the optical systems 2, 3, etc, as if being a white point light source capable of changing the color, the intensity and a gradation.

The collimator lenses 7 are likewise independently provided for the right and left eyes. In FIG. 2, the collimator lens 7L for the left eye is illustrated, while the collimator lens 7R for the right eye is not illustrated. The collimator lenses 7 (7L, 7R) substantially collimate beams of light from the light sources 6 (6L, 6R), and thus lead the collimated light to the scanning mirror 1.

A predetermined surface is two-dimensionally, in horizontal/vertical directions, scanned with the light emitted from the light sources 6 and modulated based on the image information thereby forming a two-dimensional image thereon. The light deflected by the scanning mirror 1 gets incident on the optical systems 2, 3, wherein the light is led via the optical systems 2, 3 to the both eyes (the exit pupils 8) of the observer. Through the optical systems 2, 3, the observer observes the two-dimensional image formed by the scanning as an enlarged virtual image.

The scanning mirror 1 is disposed in a middle position between the optical systems 2, 3 and is shared with these two optical systems. The light source 6L for the left eye and the collimator lens 7L are, as shown in FIG. 2, disposed on the right side of the scanning mirror 1 and above (in a direction perpendicular to a plane H) a local meridional section (the plane H (=XZ plane) formed by a field angle central beam after being reflected by the scanning mirror 1) extending from the scanning mirror 1 to the exit pupil 8L. The light source 6R for the right eye and the collimator lens 7R are disposed in a mirror symmetry with, though not illustrated, the light source 6L for the left eye and the collimator lens 7L, and also disposed on the left side of the scanning mirror 1 and above the plane H. With this arrangement, the right and left observing systems can be disposed without any mechanical interference, whereby a compact configuration of the whole optical system can be attained. It is to be noted that the light sources 6 (6L, 6R) and the collimator lenses 7 (7L. 7R) may also be disposed under the plane H.

Further, on the plane H, a mechanical deflection angle of the scanning mirror 1 is on the order of ±6.25°, and an optical deflection angle thereof is on the order of ±12.5°. At this time, a field angle beam of ±15° (in a laterally horizontal direction) is obtained on the surface of the exit pupil 8. As a matter of course, the scanning is simultaneously conducted in a vertical direction, and a field angle beam of ±11.3° (in an up-and-down perpendicular direction) is obtained on the surface of the exit pupil 8.

The following is an in-depth description of each of the elements for the left eye. The explanations of the respective elements for the right eye are omitted, however, these elements are symmetric with the elements for the left eye and have the same action.

The optical system 2 is configured by a prism (a first optical element) P1, a prism (a second optical element) P2 and a diffusion reflection plate 4. An exit surface P1e of the prism P1 and an incidence surface B of the prism P2 take substantially the same configuration and are cemented. The exit surface P1e and the incidence surface B may, however, be disposed with a minute air layer therebetween.

The prism P1 has five optical surfaces (P1a–P1e). Among these optical surfaces, P1a and P1e are transmissive surfaces (the incidence surface P1a, the exit surface P1e), while P1b, P1c and P1d are reflection surfaces.

The prism P2 has three optical surfaces A1, A2 and B. The optical surface A1 has reflex action (total reflection from an internal surface is effected twice) and transmissive action. Part of the optical surface B is formed with a minute transmissive opening (minute transmissive pinhole) 5, and an area peripheral to this pinhole 5 serves as a reflection surface. The optical surface A2 is a surface exhibiting only the reflex action. The optical surface B acts as the incidence surface and the reflection surface as well. The optical surface A1 acts as the exit surface (the exit surface toward the diffusion reflection plate 4 and the exist surface toward to the exit pupil 8), the incidence surface (the incidence surface serving for when incident upon the prism P2 from the diffusion reflection plate 4) and the reflection surface (the internal total reflection is effected twice).

The diffusion reflection plate 4 takes a parallel-flat plate configuration, wherein the surface on the side of the prism P2 has diffusion action, and the surface on the other side serves as a return reflection surface 4a.

Reflective coats are formed on the reflection surfaces P1b, P1c, P1d of the prism P1, the optical surface A2 of the prism P2 and the return reflection surface 4a of the diffusion reflection plate 4. The reflective coat is also formed on the area excluding the minute transmissive opening 5 on the optical surface B of the prism P2. Note that a metallic coat is adopted as the reflective coat. The metallic coat has a flat characteristic of spectral reflectance characteristic and has advantages of being inconspicuous in coloring of the reflected light and of having almost no difference in reflectance with respect to the light different in its polarizing direction.

To begin with, the optical path from the scanning mirror 1 to the exit pupil 8L shown in FIG. 1 will be explained.

Each field angle beam reflected and scanned by the scanning mirror 1 is incident on the incidence surface P1a of the prism P1, then reflected by the reflection surfaces P1b, P1c, P1d in this sequence and exits the exit surface P1e. At this time, an image of the light source 6 is formed once as an intermediate image inside the prism P1. Namely, it follows that a two-dimensional image of the first time is formed on this intermediate imaging plane.

The light exiting the exit surface P1e of the prism P1 is incident on the minute transmissive opening 5 formed in the optical surface B of the prism P2, then reflected by the optical surface A1 (the internal total reflection) and the optical surface A2 in this sequence, again gets incident on the optical surface A1 at an angle equal to or smaller than a critical angle, and exits the optical surface A1.

Then, after exiting the prism P2, the intermediate image of the light source 6 is again formed on the diffusion reflection plate 4. Namely, it follows that the two-dimensional image is formed on the diffusion reflection plate 4. A light beam that is diffusion-reflected by the diffusion reflection plate 4 forms a thick light beam (unillustrated) having a small F-number (bright). Further, the diffusion reflection plate 4, which is a return reflection surface, reflects the incident light so as to return this light in a direction substantially opposite toward the incident direction. To be specific, the light reflected by the diffusion reflection plate 4 is again incident upon the optical surface A1 of the prism P2, exits the prism 2 from the optical surface A1 after being reflected by the optical surface A2, then totally reflected by within the optical surface A1 and reflected by the optical surface B toward the exit pupil 8 (an eyeball), and reaches the exit pupil 8.

The observer places the left eye close to the position of the exit pupil 8, thereby enabling visual recognition of an enlarged image of the two-dimensional image formed on the diffusion reflection plate 4.

It should be noted that the two-dimensional scanning mirror 1, the minute transmissive opening 5 and the exit pupil 8 are in a conjugate relationship with each other.

A reciprocating optical path formed by the prism 2 and the diffusion reflection plate 4 will be again briefly described.

The light emerging from the exit surface P1e of the prism P1 travels in the sequence such as the optical surface B (transmission (1))>the optical surface A1 (reflection (1)) >the optical surface A2 (reflection (2))>the optical surface A1 (transmission (2))>the return reflection surface 4a (diffusion surface)>the optical surface A1 (transmission (3))>the optical surface A2 (reflection (3))>the optical surface A1 (reflection (4))>the optical surface B (reflection (5))>the optical surface A1 (transmission (4)). Thus, it is understood that the light traces the optical path back so far at the boundary of the reflection on the return reflection surface 4. A path from the optical surface B (transmission (1)) to the return reflection surface 4 is an outgoing path, and an optical path from the return reflection surface 4 to the optical surface B (reflection (5)) is an return path. This reciprocating optical path serves to make the optical system compact even in such a type of optical system that the intermediate image is formed twice, which needs an elongate optical path.

Note that FIGS. 1 and 2 illustrate only the light beams regularly reflected by the diffusion reflection plate 4. A diameter of the exit pupil 8 is on the order of 1.5 mm.

In the present embodiment, the scanning mirror 1 involves using a scanning mirror of which the maximum effective diameter is as extremely small as 3 mm or smaller. This scanning mirror 1 performs the horizontal and vertical scanning and leads the light beam based on the image information to the optical systems 2 and 3.

The two-dimensional scanning mirror 1 having the effective diameter of 2.5 mm and the transmissive opening 5 having a size (aperture) of which a diameter is 3 mm, are in the conjugate relationship with each other.

Further, the first intermediate imaging plane of the intermediate image of the light reflected by the scanning mirror 1, is formed in a position Q1 between the reflection surface P1$b$ and the reflection surface P1$c$ after the beam of light has got incident on the prism P1. The second intermediate imaging plane of the intermediate image is formed in a position Q2 in the vicinity of the return reflection surface (diffusion reflection plate 4). Thus, one intermediate imaging plane is formed outside (on the side of the ear) each of the right and left eyes, and another intermediate imaging plane is formed inside (on the side of the nose) each of the right and left eyes. Moreover, an inclined angle θ of the two-dimensional scanning mirror 1 with respect to the surface perpendicular to the same plane is 15°.

Next, features of the present embodiment will be explained.

Figure 3:
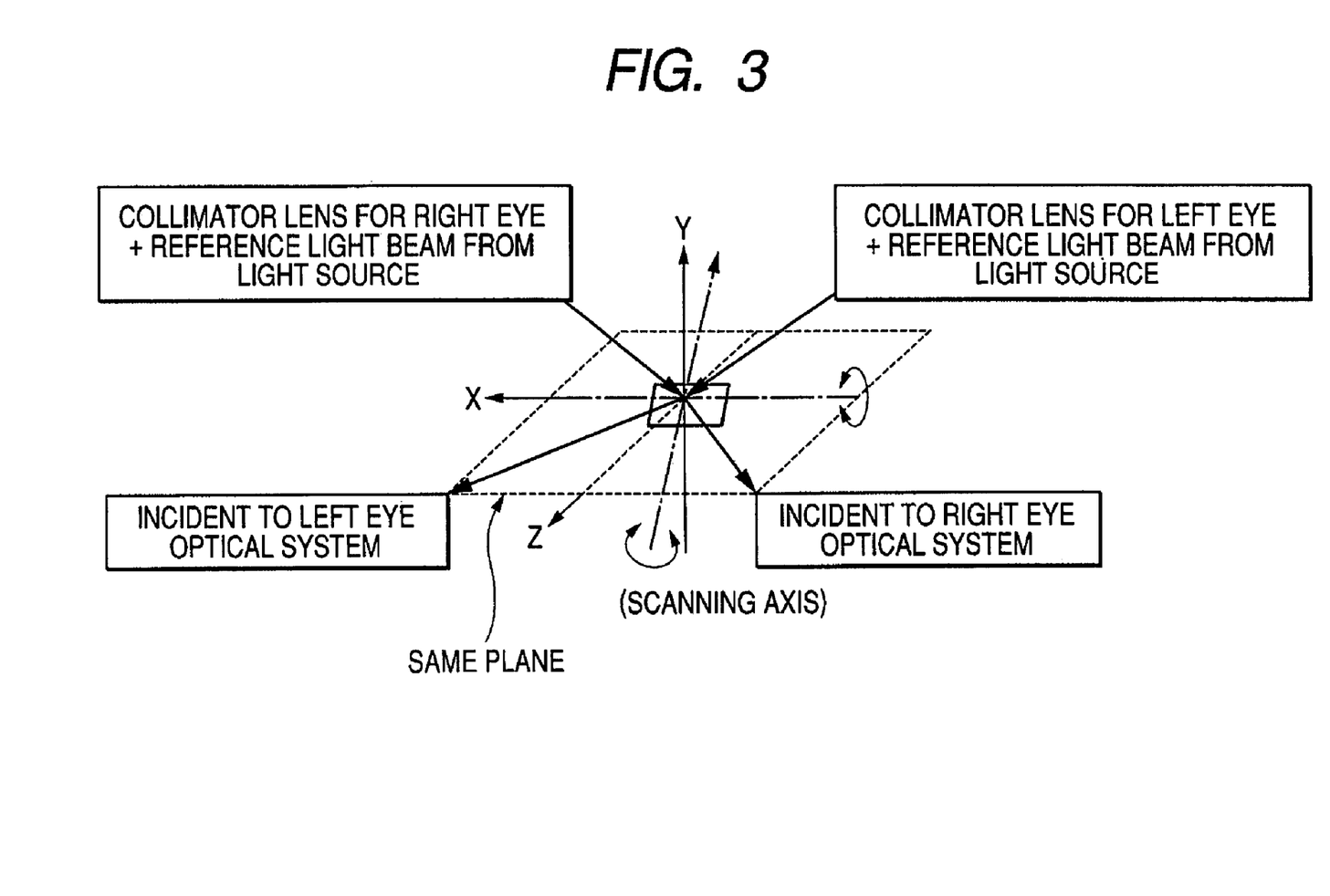
FIG. 3 is an explanatory view showing a layout of the two-dimensional scanning mirror.

In the present embodiment, as shown in FIG. 3, two central field angle principal rays, after exiting each of the two light sources 6L, 6R for the right and left eyes and being reflected by the two-dimensional scanning mirror 1, exist within the same plane H (XZ plane). Then, the following conditional expression is satisfied:

$$5°<θ<80°,$$

where θ represents an angle of the two-dimensional scanning mirror 1 in a reference state to a surface vertical to the central field angle beams between the right and left in the positions where the beams exit the optical systems 2, 3 for the right and left eyes (a surface V (XY plane) vertical to the plane H). It should be noted that the reference state of the two-dimensional scanning mirror 1 corresponds to a state where the scanning mirror is not driven and is, if the mechanical deflection angle is, e.g., ±6.25°, a state where the scanning mirror 1 is at 0°, that is, at its center. Further, the central field angle principal ray is the beam of the center of the field angle and is, specifically, the beam traveling through the center of the two-dimensional image formed by the scanning by means of the scanning mirror 1 and through the center of the exit pupil 8.

If θ is less than a lower limit of the above expression, the optical path led to the optical system 2 for the left eye from the two-dimensional scanning mirror 1 is overlapped with the optical path led to the two-dimensional scanning mirror 1 from the light source 6R for the right eye, with the result that a disposition of the right and left light sources 6L, 6R becomes hard to make. If θ is larger than the upper limit of the above expression, the incident angle of the light upon the two-dimensional scanning mirror increases, and hence a large amount of distortion unpreferably occurs due to a deviation peculiar to the driving of the two-dimensional scanning mirror.

Preferably, the following conditional expression is established:

$$10°<θ<60°$$

More preferably, if the numerical range meets the following conditional expression, allowance is given to the layout of the right and left light sources, and there reaches such a level that almost no distortion occurs due to the deviation peculiar to the driving of the two-dimensional scanning mirror:

$$10°<θ<50°$$

The reflection surface (the return reflection surface) for the return reflection in the optical system according to the present embodiment may be shared with the reflection surface A1 or A2. In this case, the number of the optical surfaces can be reduced, and therefore the optical system can be downsized.

The diameter of the two-dimensional scanning mirror 1 is very small and therefore scans by reflection-deflecting a narrow beam (from 1 to 2 mm in diameter). The HMD is the observing optical system, and hence, if the narrow beam remains incident upon the eyeball as it is, a sufficient exit pupil diameter is not obtained, resulting in a cause of fatigue.

Such being the case, the diffusion reflection plate 4 is inserted in the vicinity of the intermediate imaging plane Q2, with the optical system up to the intermediate imaging plane Q2 being defined as the beam optical system, the downsizing is facilitated, and the diameter of the exit pupil 8 is set large. If the reflection type optical system is employed, the light beam is returned, so that the optical members before being incident on the diffusion reflection plate 4 and the optical members after the reflection can be shared advantageously enough to attain the downsizing.

The light beams from the light sources 6 travel via the two-dimensional scanning mirror 1, and form the intermediate imaging planes Q1 and Q2. The two-dimensional scanning mirror 1 is disposed in the position conjugate with the exit pupils 8 of the optical systems 2, 3. The light beams from two-dimensional scanning mirror 1 form the two-dimensional images on the intermediate imaging planes Q1 and Q2.

Some portions (the portions from the light sources 6 up to the intermediate imaging plane Q1) of the optical systems 2 and 3 configure a relay optical system that forms the intermediate images with the light beams emitted from the light sources. The two-dimensional scanning mirror 1 is disposed in a position corresponding to a stop of this relay optical system, and the stop (a scanning reflection member) of the relay optical system and the exit pupil 8 of the optical system are set in a conjugate relationship, thereby preventing the light beam from being vignetted when the observer places the eye onto the exit pupil 8.

Another, that is, the third conjugate plane exists along the optical paths between the two conjugate planes of the two-dimensional scanning mirror 1 and the exit pupils 8 of the optical systems, wherein the minute transmissive opening 5 is positioned on this third conjugate plane.

In the case of widening the field angle by use of the two-dimensional scanning mirror 1 shared with the right and left optical systems, it is preferable that two relay optical systems be provided.

Accordingly, the two-dimensional scanning mirror 1 is disposed in the position of the stop in the first relay optical system, and three optical members such as the stop (the minute transmissive opening 5) of the second relay optical system and the exit pupils 8 of the optical systems 2, 3 are set in the conjugate relationship, thereby preventing the light beam from being vignetted even when widening the field angle.

In the optical system 2, the minute area (the minute transmissive opening) 5 exhibiting the transmissive action exists in the beam effective area on the reflection surface B, and the beam effective area excluding the minute area 5 exhibiting the transmissive action is set as a surface exhibiting only the reflecting action.

The light emitted from the light source 6 is transmitted through the minute transmissive opening 5 on the reflection surface 5 and forms the intermediate imaging plane in the vicinity of the diffusion reflection surface 5, and the light beam therefrom is reflected by the reflection surface B, thereby forming an enlarged image.

It is general that a half-mirror is used as a means for simultaneously actualizing the transmission and the reflection of the light. When the light travels through the half-mirror twice by the transmission and the reflection, a light amount thereof becomes ¼ (25%) in principle, and a light utilizing efficiency declines.

By contrast, according to the present embodiment, a high light utilizing efficiency is actualized by changing a diameter of the light beam depending on a case where the light transmits the reflection surface B and a case where the light is reflected by the reflection surface B. Namely, when the light is made transmitted through the reflection surface B, an area of the portion where the light beam transmits the reflection surface B is made small while the light beam remains as a narrow beam. Then, only this minute area is formed not as the reflection surface but as the opening 5 and thus transmits the light (the metallic coat is not applied over only this area). On the other hand, in the case of reflecting the light on the reflection surface B, the diameter of the light beam on the reflection surface B is made expanded by the action of the diffusion reflection plate 4, whereby the beams from other than the minute area are all reflected. On the occasion of this reflection, the light penetrating the minute area is lost, however, it is possible to actualize the light utilizing efficiency that is by far higher than in the case of employing the half-mirror.

It is preferable that for the case of reflection, a ratio (Db/Da) be equal to or smaller than 10%, where Da represents the effective area and Db represents the area of the minute transmissive portion (the opening 5). When this value is 10%, 100%-transmission is attained when transmitted and 90%-reflection is attained when reflected, with the result that the light utilizing efficiency becomes 90% (which does not take account of the surface reflection, absorption by the reflective coat, etc).

Further, if Db/Da is larger than 10%, the light amount in the minute transmissive area 5 decreases when reflected, and it is unpreferable that a difference in brightness might be observed when observing the enlarged image. Further, if the Db/Da ratio is equal to or lower than 5% (if the light utilizing efficiency is equal to or larger than 90%), almost no decrease in the light amount is observed in the minute transmissive area 5. Moreover, although the minute transmissive area 5 takes preferably a circular or elliptical shape, it may also take a rectangular shape. It is desirable that the minute transmissive areas 5 be disposed in symmetric positions in a lateral or vertical direction within the reflection effective area. This arrangement facilitates acquisition of positional accuracy when manufacturing the minute transmissive area 5.

As described above, the optical systems 2 and 3 form the optical path (outgoing path) along which the light beams reflected by the one or more reflection surfaces Ai eccentric with respect to the light beams from the two-dimensional scanning mirror 1 reach the diffusion reflection plate 4, and form the optical path (return path) along which the light beams are, after being reflected in the return backward direction by the diffusion reflection plate 4, reflected on one or more eccentric reflection surfaces Ai and the reflection surface B, and exit the optical surface(s) Ai.

The light beams from the light sources 6 pass through the two-dimensional scanning mirror 1, after traveling forward along the outgoing path and traveling backward along the return path via the return diffusion reflection plate 4, are then reflected by the reflection surfaces eccentric to the light beams and are led to the eyeballs 8 while forming an optical path different from the return path.

With this arrangement, the light beams after exiting the reciprocating optical path can be set in the direction different from the direction in which the light beams enter the reciprocating optical path, and the interference with the incident light upon the reciprocating optical path can be avoided.

The intermediate imaging plane and the diffusion surface are set on the return diffusion reflection plate 4 for the outgoing path and the return path, the narrow beam optical system is established on the outgoing path, while the diffused light optical system capable covering the wide exit pupils is established on the return path, thus attaining the downsizing of the optical system and the expansion of the exit pupils.

The optical systems 2 and 3 include the prism members P1 and P2 each composed of three or more optical surfaces that have the plurality of rotational asymmetric surfaces (which are so-called "free-form curved surfaces").

The optical system according to the present invention is the eccentric optical system, and therefore an eccentric aberration occurs. The eccentric aberration occurred is reduced by the plurality of rotational asymmetric surfaces.

Further, an aspect ratio, that is, a ratio of the horizontal direction to the vertical direction on the display screen, can be set without any restriction by making the scanning mirror movable. Moreover, the aspect ratio of the display screen, which is set by use of the scanning mirror, can be also changed to a necessary value (3:4 or 9:16) by the plurality of reflection surfaces included in the optical systems 2 and 3.

It is preferable that the rotational asymmetric surface takes a plane-symmetric configuration in which the local meridional section (the plane H) is the only one symmetric surface. This is because the working and manufacturing can be more facilitated than in the case of having none of the symmetric property. Furthermore, if configured as the prism member, the plurality of conventional components (optical surfaces) can be replaced with one prism member, thereby making the assembling adjustment easier.

The optical systems 2 and 3 employ the construction of having one or more internal total reflection surfaces, wherein at least two or more total reflections take place.

Herein, the total reflection is a phenomenon, wherein the light beam is reflected theoretically 100% when the light beam enters at a angle equal to or greater than the critical angle to the normal line of the surface when reflected within the prism or within the glass. The total reflection is higher in the light utilizing efficiency than the metallic coat reflection and dielectric film reflection, and can therefore eliminate the loss of the light amount on the surface. In the present embodiment, the internal total reflection surfaces are provided in the reciprocating optical path.

The optical system is configured so that the light beams from the right and left eyeballs 8L, 8R are reflected outward (on the sides of the ears) on the reverse light beam traces on the local meridional sections to the two-dimensional scanning mirror 1 and to the light sources 6 from the eyeballs 8, thereafter travel through before the right and left eyeballs and are led to the two-dimensional scanning mirror 1 inward (on the side of the nose).

For establishing the HMD optical system having the elongate optical paths by use of the single two-dimensional scanning mirror 1, it is required that the two-dimensional scanning mirror 1 be disposed in the middle (in the vicinity of the nose) between the right and left eyes. Then, with this configuration, the optical paths are developed in the right and left directions, and hence the elongate optical paths can be accommodated within the HMD optical system while making the up-and-down breadth compact.

The optical system has the two intermediate imaging planes, wherein on the local meridional section, one intermediate imaging plane is provided outside (on the side of the ear) of each of the right and left eyes 8L and 8R and another intermediate imaging plane is provided inside (on the side of the nose) of each of the right and left eyes 8L and 8R.

For enabling the field angle to be widened by use of the single two-dimensional scanning mirror 1, the light beams from the light sources 6 are formed twice as the intermediate images. With this contrivance, the degree of freedom in design is increased.

When the intermediate image is formed twice, however, the optical path length in the optical system becomes extremely elongate, resulting in a scale-up. With the construction described above, the widening of the field angle and the compact configuration by use of the single two-dimensional scanning mirror 1 can be simultaneously accomplished.

Further, if the return reflection surface is a curved surface, the directions of the light beams of the peripheral image can be individually controlled when reflected, and therefore the optical system can be downsized more readily than in the case where the return reflection surface is the flat surface. If the return reflection surface is the rotational asymmetric surface, the directions of the beams of the peripheral image can be controlled without any restriction, so that the downsizing is more facilitated than in the case of the curved surface. The metallic mirror coating capable of reflecting as much as 100% is applied over this return reflection surface, whereby the loss in the light amount is reduced to the greatest possible degree.

Further, the return reflection surface may be formed on a component separate from the prism or on the prism surface.

Examples of the numerical values will hereinafter be explained. The present embodiment involves using a local-paraxial axis, which will be described. In FIGS. 1 and 2, a surface vertex coordinate system of the first surface (the exit pupil 8) is illustrated in FIG. 2. In the present embodiment, each surface is rendered just shift-eccentric in the x-axis direction and tilt-eccentric about the y-axis. It should be noted that only the two-dimensional scanning mirror 1 is rendered tilt-eccentric (15°) about the x-axis. Further, the general meridional section described above and a sagittal section are each a definition of the general-paraxial axis, while the local meridional section and a local sagittal section are each a definition of a local-paraxial axis that will hereinafter be described. Moreover, as to the local paraxial-axis, definitions of a local radius-of-curvature, a local surface-to-surface interval, a local focal length and local refractive power, which correspond to the eccentric system, will be explained as below.

In the present embodiment, the light beams emitted from the light source 6 and traveling through the center of the secondary image and the center of the exit pupil 8 of the optical system, are defined as the central field angle principal rays. Then, the present embodiment employs not a set of the conventional radius-of-curvature, surface-to-surface interval, focal length and refractive power that are based on the reference of the surface vertex of each surface, but a set of the local radius-of-curvature, the local surface-to-surface interval, the local focal length and the local refractive power that are based on the reference of the hit point (the incident point) of the central field angle principal ray on each surface.

Herein, the local radius-of-curvature denotes a local radius-of-curvature (a radius of curvature on the local meridional section, and a radius of curvature on the local sagittal section) at the hit point on the optical surface. Further, the local surface-to-surface interval represents a value (a distance on the central field angle principal ray, a value without air conversion) of a distance between the two hit points on the present surface and the next surface. Moreover, the local focal length represents a value calculated by a conventional focal length calculating method (paraxial axis tracing) from the local radius-of-curvature, the refractive power in front and in rear of the surface and the local surface-to-surface interval. The local refractive power is a value of an inverse number of the local focal length.

Note that the embodiment shows the local radius-of-curvature, a refractive index of the surface, the local surface-to-surface interval and the local focal length together with the conventional radius of curvature, surface-to-surface interval, eccentricity, refractive index and Abbe number. Table 1 shows numerical value data in the present embodiment. In the general-paraxial axis in Table 1, rx represents a radius of curvature in the meridional section, ry denotes a radius of curvature in the sagittal section, d designates a surface-to-surface interval (parallel to the surface vertex coordinate system of the first surface), eccentricity (shift represents parallel eccentricity of the surface vertex of each surface with respect to the surface vertex coordinate system of the first surface, and tilt degree is tilt eccentricity in the meridional section from the exit pupil to the two-dimensional scanning mirror), nd represents a refractive index of d-line, vd designates an Abbe number, and FXY denotes a free curved surface. Further, an element attached with M represents a reflection surface, an element attached with (M(dif) represents a diffusion reflection surface), and the refractive index nd of d-line is given a reverse sign. Note that Table 1 shows the numerical value data of the reverse trace to the two-dimensional scanning mirror from the exit pupil, the tilt degree as the tilt eccentricity is an angle on the xz-section in FIG. 2, and hence tilt eccentricity 15° (yz-section) about the x-axis of the two-dimensional scanning mirror is omitted. A definition formula of FXY (free curved surface) is given as follows. (In the surface vertex coordinate system of each surface:)

$$z = \frac{cr^2}{1 + SQRT[1-(1+k)c^2r^2]} + \sum_{i=2}^{66} C_j x^m y^n$$

$$j = [(m+n)^2 + m + 3n]/2 + 1$$

where, $$m+n \leq 10$$

$$r^2 = x^2 + y^2$$

z: the sagitta of the surface parallel to the z-axis,
c: the curvature of in each-surface vertex coordinates
k: The conic constant
$C_j$: the coefficient of $x^m y^n$ The symbol $C_j$ represents the coefficient of the free curved surface, however, this coefficient is expressed with $x^m y^n$ in Table 1. In the case of this free curved surface, the free-form curved surface coefficient contains a coefficient concerning the paraxial axis, and hence the values of the meridional section radius-of-curvature rx and the sagittal section radius-of-curvature ry of the general-paraxial axis are not coincident with the actual meridional section radius-of-curvature rx and the actual sagittal section radius-of-curvature ry on the surface vertex. There are also shown the actual meridional section radius-of-curvature rx and the actual sagittal section radius-of-curvature ry at the pint (0, 0), i.e., on the surface vertex. Moreover, in the local-paraxial axis, there are shown local radii-of-curvature local-rx and local-ry, a local surface-to-surface interval local-d (the reflection surface is the reverse symbol), local focal lengths local-fx and local-fy, and a surface refractive index nd (the reflection surface in the reverse symbol). Shown further are a hit point coordinate (the surface vertex is 0, 0) on each surface and angles-of-view 2Wx and 2Wy (a total full field angle of a plus (+) side and a minus (−) side) at the exit pupils.

TABLE 1

| | n | rx | ry | d | shift | tilt | nd | vd |
|---|---|---|---|---|---|---|---|---|
| | | (general - paraxial axis) | | | | | | |
| | 1 | 0.00000 | 0.00000 | 25.328 | 0.000 | 0.000 | 1.000 | |
| | 2 | 0.00000 | 0.00000 | 0.000 | 0.000 | 0.000 | 1.000 | |
| | 3 | 0.00000 | 0.00000 | 0.000 | 0.000 | 0.000 | 1.000 | |
| | 4 | 0.00000 | 0.00000 | 0.000 | 0.000 | 0.000 | 1.000 | |
| | 5 | 0.00000 | 0.00000 | 0.000 | 0.000 | 0.000 | 1.000 | |
| | 6 | 0.00000 | 0.00000 | 0.000 | 0.000 | 0.000 | 1.000 | |
| | 7 | 0.00000 | 0.00000 | 0.000 | 0.000 | 0.000 | 1.000 | |
| FX | 8 | −241.43953 | −241.43953 | 13.532 | −0.064 | 4.102 | 1.571 | 33.80 |
| FXY | 9 | −112.30604 | −112.30604 | −13.532 | −4.749 | −22.106 | −1.571 | 33.80 |
| FXY-M | 10 | −241.43953 | −241.43953 | 20.598 | −0.064 | 4.102 | 1.571 | 33.80 |
| FXY-M | 11 | −108.55703 | −108.55703 | −22.822 | 24.106 | 28.627 | −1.571 | 33.80 |
| | 12 | 0.00000 | 0.00000 | 0.000 | 11.649 | 28.627 | −1.571 | 33.80 |
| | 13 | 0.00000 | 0.00000 | 0.000 | 11.649 | 28.627 | −1.571 | 33.80 |
| | 14 | 0.00000 | 0.00000 | 0.000 | 11.649 | 28.627 | −1.571 | 33.80 |
| | 15 | 0.00000 | 0.00000 | 2.224 | 11.649 | 28.627 | −1.571 | 33.80 |
| FXY | 16 | −241.43953 | −241.43953 | −1.995 | −0.064 | 4.102 | −1.000 | |
| | 17 | 0.00000 | 0.00000 | 0.000 | −0.207 | 4.102 | −1.000 | |
| | 18 | 0.00000 | 0.00000 | −1.431 | −0.207 | 4.102 | −1.000 | |
| M(dif) | 19 | −200.00000 | −200.00000 | 0.000 | 19.742 | 9.102 | 1.000 | |
| | 20 | 0.00000 | 0.00000 | 3.425 | 19.742 | 9.102 | 1.000 | |
| FXY | 21 | −241.43953 | −241.43953 | 20.598 | −0.064 | 4.102 | 1.571 | 33.80 |
| FXY-M | 22 | −108.55703 | −108.55703 | −20.598 | 24.106 | 28.627 | −1.571 | 33.80 |
| FXY-M | 23 | −241.43953 | −241.43953 | 13.532 | −0.064 | 4.102 | 1.571 | 33.80 |
| FXY | 24 | −112.30604 | −112.30604 | 13.897 | −4.749 | −22.106 | 1.571 | 33.80 |
| | 25 | 0.00000 | 0.00000 | 0.000 | −10.394 | −22.106 | 1.571 | 33.80 |
| | 26 | 0.00000 | 0.00000 | 0.000 | −10.394 | −22.106 | 1.571 | 33.80 |
| | 27 | 0.00000 | 0.00000 | 0.636 | −10.394 | −22.106 | 1.571 | 33.80 |
| M | 28 | −80.00000 | −80.00000 | −15.739 | −8.828 | −59.106 | −1.571 | 33.80 |
| M | 29 | 50.00000 | 50.00000 | −0.845 | −1.930 | −87.894 | 1.571 | 33.80 |
| M | 30 | −60.00000 | −60.00000 | 6.098 | −24.915 | −20.894 | −1.571 | 33.80 |
| | 31 | 20.00000 | 20.00000 | −42.908 | −26.869 | 19.106 | −1.000 | |
| | 32 | 0.00000 | 0.00000 | 48.955 | 0.000 | 0.000 | −1.000 | |
| | 33 | 0.00000 | 0.00000 | 0.000 | −31.500 | 0.000 | −1.000 | |
| | 34 | 0.00000 | 0.00000 | 0.000 | −31.500 | 0.000 | −1.000 | |

| | | | | |
|---|---|---|---|---|
| FXY 8 | K: 4.9698E+00 | Y2: −1.8382E−03 | X2: 4.8459E−05 | |
| | Y2X: −1.3099E−05 | X3: −3.7349E−06 | Y4: −3.5111E−06 | |
| | Y2X2: −1.1789E−06 | X4: −4.9937E−08 | | |
| FXY 9 | K: −2.6430E+00 | Y2: 1.9693E−04 | X2: −1.3254E−03 | |
| | Y2X: 1.4089E−05 | X3: −5.2128E−06 | Y4: −1.7249E−06 | |
| | Y2X2: 8.6598E−07 | X4: 8.4995E−07 | | |
| FXY 10 | K: 4.9698E+00 | Y2: −1.8382E−03 | X2: 4.8459E−05 | |
| | Y2X: −1.3099E−05 | X3: −3.7349E−06 | Y4: −3.5111E−06 | |
| | Y2X2: −1.1789E−06 | X4: −4.9937E−08 | | |
| FXY 11 | K: 1.8063E+00 | Y2: −1.3292E−03 | X2: 5.9594E−04 | |
| | Y2X: −1.3289E−05 | X3: 1.1202E−05 | Y4: −3.2506E−07 | |
| | Y2X2: −1.3473E−06 | X4: −2.6143E−07 | | |

TABLE 1-continued

| | | | |
|---|---|---|---|
| FXY 16 | K: 4.9698E+00 | Y2: −1.8382E−03 | X2: 4.8459E−05 |
| | Y2X: −1.3099E−05 | X3: −3.7349E−06 | Y4: −3.5111E−06 |
| | Y2X2: −1.1789E−06 | X4: −4.9937E−08 | |
| FXY 21 | K: 4.9698E+00 | Y2: −1.8382E−03 | X2: 4.8459E−05 |
| | Y2X: −1.3099E−05 | X3: −3.7349E−06 | Y4: −3.5111E−06 |
| | Y2X2: −1.1789E−06 | X4: −4.9937E−08 | |
| FXY 22 | K: 1.8063E+00 | Y2: −1.3292E−03 | X2: 5.9594E−04 |
| | Y2X: −1.3289E−05 | X3: 1.1202E−05 | Y4: −3.2506E−07 |
| | Y2X2: −1.3473E−06 | X4: −2.6143E−07 | |
| FXY 23 | K: 4.9698E+00 | Y2: −1.8382E−03 | X2: 4.8459E−05 |
| | Y2X: −1.3099E−05 | X3: −3.7349E−06 | Y4: −3.5111E−06 |
| | Y2X2: −1.1789E−06 | X4: −4.9937E−08 | |
| FXY 24 | K: −2.6430E+00 | Y2: 1.9693E−04 | X2: −1.3254E−03 |
| | Y2X: 1.4089E−05 | X3: −5.2128E−06 | Y4: −1.7249E−06 |
| | Y2X2: 8.6598E−07 | X4: 8.4995E−07 | |

| n | point (x, y) | rx | ry |
|---|---|---|---|
| 8 | (0.000, 0.000) | −247.224 | −127.905 |
| 9 | (0.000, 0.000) | −86.542 | −117.504 |
| 10 | (0.000, 0.000) | −247.224 | −127.905 |
| 11 | (0.000, 0.000) | −124.690 | −84.244 |
| 12 | (0.000, 0.000) | 0.000 | 0.000 |
| 13 | (0.000, 0.000) | 0.000 | 0.000 |
| 14 | (0.000, 0.000) | 0.000 | 0.000 |
| 15 | (0.000, 0.000) | 0.000 | 0.000 |
| 16 | (0.000, 0.000) | −247.224 | −127.905 |
| 17 | (0.000, 0.000) | 0.000 | 0.000 |
| 18 | (0.000, 0.000) | 0.000 | 0.000 |
| 19 | (0.000, 0.000) | −200.000 | −200.000 |
| 20 | (0.000, 0.000) | 0.000 | 0.000 |
| 21 | (0.000, 0.000) | −247.224 | −127.905 |
| 22 | (0.000, 0.000) | −124.690 | −84.244 |
| 23 | (0.000, 0.000) | −247.224 | −127.905 |
| 24 | (0.000, 0.000) | −86.542 | −117.504 |
| 25 | (0.000, 0.000) | 0.000 | 0.000 |
| 26 | (0.000, 0.000) | 0.000 | 0.000 |
| 27 | (0.000, 0.000) | 0.000 | 0.000 |
| 28 | (0.000, 0.000) | −80.000 | −80.000 |
| 29 | (0.000, 0.000) | 50.000 | 50.000 |
| 30 | (0.000, 0.000) | −60.000 | −60.000 |
| 31 | (0.000, 0.000) | 20.000 | 20.000 |
| 32 | (0.000, 0.000) | 0.000 | 0.000 |
| 33 | (0.000, 0.000) | 0.000 | 0.000 |

(local − paraxial axis)

| | n | local-rx | local-ry | local-fx | local-fy | local-d | nd |
|---|---|---|---|---|---|---|---|
| FXY | 8 | −247.13702 | −127.87755 | −432.890 | −223.993 | 15.447 | 1.571 |
| FXY-M | 9 | −88.50181 | −120.68528 | 28.169 | 38.413 | −21.505 | −1.571 |
| FXY-M | 10 | −218.60629 | −115.20030 | −69.580 | −36.667 | 26.059 | 1.571 |
| FXY-M | 11 | −123.70343 | −78.17622 | 39.373 | 24.883 | −26.120 | −1.571 |
| | 12 | 0.00000 | 0.00000 | 0.000 | 0.000 | 0.000 | −1.571 |
| | 13 | 0.00000 | 0.00000 | 0.000 | 0.000 | 0.000 | −1.571 |
| | 14 | 0.00000 | 0.00000 | 0.000 | 0.000 | 0.000 | −1.571 |
| | 15 | 0.00000 | 0.00000 | 0.000 | 0.000 | −7.198 | −1.571 |
| FXY | 16 | −174.34714 | −91.32425 | −305.390 | −159.965 | −0.022 | −1.000 |
| | 17 | 0.00000 | 0.00000 | 0.000 | 0.000 | 0.000 | −1.000 |
| | 18 | 0.00000 | 0.00000 | 0.000 | 0.000 | −1.137 | −1.000 |
| M | 19 | −200.00000 | −199.75385 | −100.000 | −99.877 | 0.246 | 1.000 |
| | 20 | 0.00000 | 0.00000 | 0.000 | 0.000 | 0.870 | 1.000 |
| FXY | 21 | −174.83857 | −91.59893 | −306.251 | −160.447 | 19.795 | 1.571 |
| FXY-M | 22 | −126.10038 | −79.83868 | 40.136 | 25.412 | −29.791 | −1.571 |
| FXY-M | 23 | −233.21748 | −122.27759 | −74.231 | −38.920 | 19.418 | 1.571 |
| FXY | 24 | −87.13352 | −116.99594 | 0.000 | 0.000 | 16.342 | 1.571 |
| | 25 | 0.00000 | 0.00000 | 0.000 | 0.000 | 0.000 | 1.571 |
| | 26 | 0.00000 | 0.00000 | 0.000 | 0.000 | 0.000 | 1.571 |
| | 27 | 0.00000 | 0.00000 | 0.000 | 0.000 | 6.524 | 1.571 |
| M | 28 | −80.00000 | −79.46374 | 25.463 | 25.292 | −10.489 | −1.571 |
| M | 29 | 50.00000 | 49.53014 | 15.914 | 15.765 | 21.359 | 1.571 |
| M | 30 | −60.00000 | −59.93035 | 19.097 | 19.075 | −8.346 | −1.571 |
| | 31 | 20.00000 | 19.99258 | 35.032 | 35.019 | −54.084 | −1.000 |
| | 32 | 0.00000 | 0.00000 | 0.000 | 0.000 | −61.461 | −1.000 |
| | 33 | 0.00000 | 0.00000 | 0.000 | 0.000 | 0.000 | −1.000 |

| n | hitpoint(x, y) |
|---|---|
| 8 | (0.064, 0.000) |

TABLE 1-continued

| | |
|---|---|
| 9 | (5.491, 0.000) |
| 10 | (13.910, 0.000) |
| 11 | (12.433, 0.000) |
| 12 | (18.571, 0.000) |
| 13 | (18.571, 0.000) |
| 14 | (18.571, 0.000) |
| 15 | (18.571, 0.000) |
| 16 | (30.102, 0.000) |
| 17 | (30.107, 0.000) |
| 18 | (30.107, 0.000) |
| 19 | (9.920, 0.000) |
| 20 | (9.912, 0.000) |
| 21 | (29.922, 0.000) |
| 22 | (10.078, 0.000) |
| 23 | (7.786, 0.000) |
| 24 | (−1.493, 0.000) |
| 25 | (−7.950, 0.000) |
| 26 | (−7.950, 0.000) |
| 27 | (−7.950, 0.000) |
| 28 | (−9.247, 0.000) |
| 29 | (6.838, 0.000) |
| 30 | (−2.890, 0.000) |
| 31 | (−0.545, 0.000) |
| 32 | (6.348, 0.000) |
| 33 | (0.688, 0.000) |

| local_fx(8-33) | local_fy(8-33) | 2Wx | 2Wy |
|---|---|---|---|
| −9.825 | −12.355 | 30.00 | 11.30 |

This application claims priority from Japanese Patent Application No. 2004-351468 filed on Dec. 3, 2004, which is hereby incorporated by reference herein.

What is claimed is:

1. An image observing apparatus comprising:
two light sources for right and left eyes;
a scanning mirror upon which light beams from said two light sources are incident in common; and
two optical systems, for the right and left eyes, leading the light beams emitted from said two light sources and deflected by said scanning mirror to the right and left eyes of an observer,
wherein the light beams emitted respectively from the two light sources are deflected by said scanning mirror to scan predetermined surfaces with the light beams and thereby respectively form two-dimensional images for the right and left eyes on the predetermined surfaces,
central field angle principal rays emitted respectively from said two light sources and reflected by said scanning mirror, exist on the same plane, and
the following condition is satisfied:

$$5° < \theta < 80°,$$

where θ represents an angle made by said scanning mirror in a reference state and by a surface vertical to the central field angle principal rays emerging from said two optical systems.

2. An image observing apparatus according to claim 1, wherein each of said two optical systems forms an intermediate image of the two-dimensional image, and
each of said two optical systems has an intermediate imaging plane of the two-dimensional image or a diffusion reflection surface disposed in the vicinity of said intermediate imaging plane.

3. An image observing apparatus according to claim 1, wherein said scanning mirror and exit pupils of said two optical systems exist in positions conjugate to each other.

4. An image observing apparatus according to claim 3, wherein a conjugate plane of said scanning mirror and said exit pupils exists between optical paths extending from said scanning mirror to said exit pupils of said two optical systems.

5. An image observing apparatus according to claim 1, wherein each of said two optical systems has a reflection surface including a transmissive area,
the light beams from said scanning mirror, after transmitting said transmissive area, form the intermediate image of the two-dimensional image, and
the light beams from this intermediate image are reflected on the reflection surface.

6. An image observing apparatus according to claim 5, wherein said scanning mirror, said transmissive area and said exit pupils of said two optical systems exist in positions conjugate to each other.

7. An image observing apparatus according to claim 1, wherein each of said two optical systems has a first surface exhibiting at least reflective action and a second surface that reflects the light beams emitted from said light source and reflected by said first surface towards again said first surface, and
the central field angle principal rays getting incident again upon said first surface are reflected and travel on the side opposite to the side of the last time with respect to a normal line of the surface on a hit point thereof.

8. An image observing apparatus according to claim 1, wherein each of said two optical systems has an optical element including at least three optical surfaces containing a surface having a rotational asymmetric configuration.

9. An image observing apparatus according to claim 1, wherein said two optical systems have optical elements including a total reflection surface on which the total reflection takes place twice.

* * * * *